US012307840B1

(12) United States Patent
Minsley et al.

(10) Patent No.: US 12,307,840 B1
(45) Date of Patent: May 20, 2025

(54) SYSTEM AND METHOD FOR REVEALING UNLOCK CODES FOR LOCKS (71) Applicant: DAVINCI LOCK LLC, Raleigh, NC (US)

(72) Inventors: Bradford A. Minsley, Raleigh, NC (US); Clifton P. Minsley, Raleigh, NC (US)

(73) Assignee: DAVINCI LOCK LLC, Raleigh, NC (US)

( * ) Notice: Subject to any disclaimer, the term of this patent is extended or adjusted under 35 U.S.C. 154(b) by 0 days.

(21) Appl. No.: 18/512,257

(22) Filed: Nov. 17, 2023

(51) Int. Cl.
G07C 9/00 (2020.01)
G06F 16/955 (2019.01)
G07C 9/27 (2020.01)

(52) U.S. Cl.
CPC ..... *G07C 9/00309* (2013.01); *G06F 16/9554* (2019.01); *G06F 16/9566* (2019.01); *G07C 9/00571* (2013.01); *G07C 9/27* (2020.01); *G07C 2009/0042* (2013.01)

(58) Field of Classification Search
CPC .. G07C 9/00309; G07C 9/00571; G07C 9/27; G07C 2009/0042; G07C 9/20; G07C 9/29; G06F 16/9554; G06F 16/9566; G06K 7/14; G06K 7/10
See application file for complete search history.

(56) References Cited

U.S. PATENT DOCUMENTS

| 4,870,400 A | 9/1989 | Downs et al. |
| 5,964,110 A | 10/1999 | Crocco et al. |
| 7,047,773 B1 | 5/2006 | Lin |
| 7,236,085 B1 | 6/2007 | Aronson et al. |
| 8,108,927 B2 | 1/2012 | Michelle et al. |
| 8,774,714 B2 | 7/2014 | Metivier |

(Continued)

FOREIGN PATENT DOCUMENTS

| CN | 111599048 | 8/2020 |
| EP | 2799646 | 11/2014 |
| WO | 2012047850 | 4/2014 |

OTHER PUBLICATIONS

Defendant's Answer to Second Amended Complaint and Counterclaim, *DaVinci Lock, LLC* v. *SpiderDoor, LLC*, Civil Action No. 2:23-cv-00343-NAD, U.S. District Court for the Northern District of Alabama, Jul. 19, 2023.

(Continued)

*Primary Examiner* — Vernal U Brown
(74) *Attorney, Agent, or Firm* — Williams Mullen; Thomas F. Bergert, Esq (57) ABSTRACT

Embodiments of the present disclosure transmit and/or reveal unlock codes for locks based on trigger events and include associating unlock codes and lock identifiers with different physical locks in a database, receiving an indication associated with one of the physical locks from a communications device, retrieving an unlock code associated with the physical lock and transmitting the unlock code to the communications device and/or displaying the unlock code via the communications device. The display can optionally be through a specific URL associated with the physical lock in accordance with embodiments herein. Further, the indication received can be as a result of the communications device being in close proximity to the lock and scanning a code or reading a tag associated with the lock.

20 Claims, 7 Drawing Sheets

(56) References Cited

U.S. PATENT DOCUMENTS

| | | | |
|---|---|---|---|
| 9,464,460 | B2 | 10/2016 | Lai |
| 9,524,600 | B2 | 12/2016 | Yong et al. |
| 9,908,697 | B2 | 3/2018 | Ufkes |
| 10,121,301 | B1* | 11/2018 | Ren .................. G07C 9/00896 |
| 10,124,765 | B2 | 11/2018 | Wilt et al. |
| 10,614,646 | B1 | 8/2020 | Boss et al. |
| 11,954,958 | B2* | 4/2024 | Heller .................. G06K 7/1417 |
| 2002/0059114 | A1 | 5/2002 | Cockrill et al. |
| 2003/0061192 | A1 | 3/2003 | McGunn et al. |
| 2004/0030934 | A1 | 4/2004 | Mizogushi et al. |
| 2004/0189439 | A1 | 9/2004 | Cansino |
| 2005/0154605 | A1 | 7/2005 | Tropp |
| 2005/0237149 | A1 | 10/2005 | Loftin et al. |
| 2005/0241003 | A1 | 10/2005 | Sweeney et al. |
| 2007/0214369 | A1 | 9/2007 | Roberts et al. |
| 2008/0246583 | A1 | 10/2008 | Blake et al. |
| 2009/0083851 | A1 | 3/2009 | Michelle |
| 2009/0256676 | A1 | 10/2009 | Piccirillo et al. |
| 2009/0328203 | A1 | 12/2009 | Hass |
| 2012/0169461 | A1 | 7/2012 | Dubois |
| 2013/0024528 | A1 | 1/2013 | Gallant et al. |
| 2013/0139408 | A1 | 6/2013 | Chaiken |
| 2013/0335193 | A1 | 12/2013 | Hanson et al. |
| 2014/0207499 | A1 | 7/2014 | Fleiss et al. |
| 2014/0207657 | A1 | 7/2014 | Gacs |
| 2014/0266585 | A1 | 9/2014 | Chao et al. |
| 2015/0077223 | A1 | 3/2015 | Pipes |
| 2015/0078137 | A1 | 3/2015 | Lee et al. |
| 2015/0186840 | A1 | 7/2015 | Torres et al. |
| 2015/0199859 | A1 | 7/2015 | Ouyang et al. |
| 2015/0199863 | A1 | 7/2015 | Scoggins et al. |
| 2015/0269799 | A1 | 9/2015 | Martinez et al. |
| 2015/0356801 | A1 | 12/2015 | Nitu et al. |
| 2016/0063235 | A1 | 3/2016 | Tussy |
| 2016/0155293 | A1 | 6/2016 | Reaves et al. |
| 2016/0173595 | A1 | 6/2016 | Miller et al. |
| 2017/0161978 | A1 | 6/2017 | Wishne |
| 2017/0236352 | A1 | 8/2017 | Conrad et al. |
| 2018/0115595 | A1 | 4/2018 | Krishnan et al. |
| 2018/0216364 | A1 | 8/2018 | Wind et al. |
| 2018/0230713 | A1 | 8/2018 | Sidhu et al. |
| 2018/0253786 | A1 | 9/2018 | Frisby et al. |
| 2018/0350170 | A1 | 12/2018 | Wang et al. |
| 2019/0088048 | A1 | 3/2019 | Minsley et al. |
| 2019/0259232 | A1 | 8/2019 | Nandakumar |
| 2019/0371101 | A1 | 12/2019 | Friedli |
| 2020/0190854 | A1 | 6/2020 | Tropp |
| 2020/0318389 | A1 | 10/2020 | Lou |
| 2020/0378155 | A1 | 12/2020 | Zhang et al. |
| 2021/0035393 | A1* | 2/2021 | Wegelin ............. G07C 9/00817 |
| 2022/0076514 | A1 | 3/2022 | Lingala et al. |
| 2022/0406111 | A1* | 12/2022 | Doyon ............... G07C 9/00896 |

OTHER PUBLICATIONS

Plaintiffs' Reply in Support of Their Motion for Preliminary Injunction, *DaVinci Lock, LLC* v. *SpiderDoor, LLC*, Civil Action No. 2:23-cv-00343-CLM, U.S. District Court for the Northern District of Alabama, Aug. 1, 2023.

Defendant's Opposition to Amended Motion for Preliminary Injunction, *DaVinci Lock, LLC* v. *SpiderDoor, LLC*, Civil Action No. 2:23-cv-00343-NAD, U.S. District Court for the Northern District of Alabama, Jul. 14, 2023.

Order, *DaVinci Lock, LLC* v. *SpiderDoor, LLC*, Civil Action No. 2:23-cv-00343-CLM, U.S. District Court for the Northern District of Alabama, Jan. 4, 2024.

United States Patent and Trademark Office (USPTO), Non-final Office Action, U.S. Appl. No. 18/196,007, Aug. 11, 2023.

United States Patent and Trademark Office (USPTO), Final Office Action, U.S. Appl. No. 18/196,007, Oct. 13, 2023.

United States Patent and Trademark Office (USPTO), Non-Final Office Action, U.S. Appl. No. 18/196,007, Feb. 20, 2024.

United States Patent and Trademark Office (USPTO), Final Office Action, U.S. Appl. No. 18/196,007, Apr. 8, 2024.

Response to United States Patent and Trademark Office (USPTO), Non-final Office Action, U.S. Appl. No. 18/196,007, Sep. 28, 2023.

Response to United States Patent and Trademark Office (USPTO), Final Office Action, U.S. Appl. No. 18/196,007, Jan. 16, 2024.

Response to United States Patent and Trademark Office (USPTO), Non-final Office Action, U.S. Appl. No. 18/196,007, Mar. 14, 2024.

Response to United States Patent and Trademark Office (USPTO), Final Office Action, U.S. Appl. No. 18/196,007, Apr. 12, 2024.

United States Patent and Trademark Office (USPTO), Non-final Office Action, U.S. Appl. No. 17/994,596, Apr. 5, 2023.

United States Patent and Trademark Office (USPTO), Response to non-final Office Action, U.S. Appl. No. 17/994,596, Oct. 3, 2023.

United States Patent and Trademark Office (USPTO), Final Office Action, U.S. Appl. No. 17/994,596, Oct. 23, 2023.

Hung et al., "A Door Lock System with Augmented Reality Technology", 2017 IEE 6th Global Conference on Consumer Electronics (GCCE 2017).

United States Patent and Trademark Office, International Search Report and Written Opinion, International Patent Application No. PCT/US2024/051782, Feb. 25, 2025.

* cited by examiner

SYSTEM AND METHOD FOR REVEALING UNLOCK CODES FOR LOCKS

TECHNICAL FIELD

The present disclosure relates generally to the field of physical locks and more particularly to a system and method for revealing unlock codes for physical locks.

BACKGROUND AND SUMMARY

Access control problems exist in different commercial and personal environments such as self-storage facilities, warehouses, marinas, businesses, cargo shipping, home rentals, recreational activity locations, sports clubs and other locations. Different types of assets, whether physical or virtual, may be protected from general access through an access control feature such as a physical lock.

In some environments, over-locks are used as a form of secondary lock. For example, self-storage units are typically rented on a monthly basis. If a customer is delinquent and does not pay rent to the self-storage facility owner by an agreed-upon due date, the owner (i.e., landlord) has a right to prevent the customer from accessing the storage unit. Self-storage facility owners typically place an over-lock over the storage unit door, such as through a hasp that prevents opening of the door. The over-lock is utilized until the customer pays the delinquent past due balance on their account. A challenge in managing self-storage facilities is the requirement that a human attendant assist with placing and removing over-locks on units where there is a delinquent account.

Another challenge in managing self-storage facilities is securing vacant storage units when they are not being rented. If the vacant units are not properly secured, these units can be entered illegally and be used to store items for free by unauthorized persons, could be used to discard trash, and could be used for other illicit or illegal activities that could pose liability and safety issues for the self-storage facility and customers of the self-storage facility. Currently, vacant units must be secured using traditional physical locks. In the event a locked vacant unit is subsequently rented, a representative of the self-storage facility must manually visit the unit and remove the lock. Such a process is burdensome, manually intensive, and increases the time between a customer renting a unit, and actually being able to access the unit.

The process of placing and removing physical locks of any kind, including over-locks, can be quite burdensome, particularly at locations which may be rented to month-to-month customers. In instances where a lock is secured at a location based on a delinquent account, the lock must ultimately be removed once the customer account becomes non-delinquent. Removing locks is time-consuming and costly as it can require manual removal by personnel that may not be on site.

Similar challenges exist in other access control environments involving physical locks. In addition, the cost of conventional locks can be prohibitive. Many conventional locks including over-locks are electronic and provide automated and remote locking/unlocking functions. Such locks oftentimes require significant capital improvements at various types of locations. Furthermore, electronic locks inherently require constant power, and their continuous twenty-four hour per day operation increases power consumption costs at locations where installed. Furthermore, as with any complex electronic device, electronic locks are subject to failure and malfunction, and can require costly repairs to be conducted by an electrician, if not ultimately requiring replacement.

Other conventional physical locks include standard combination locks. However, with various facilities at different types of locations utilizing a limited number of standard combination locks, habitually delinquent customers eventually begin to recognize the unlock codes, and these locks become futile. The facility must then perpetually replace locks with unlock codes that have become known and compromised.

Another disadvantage of standard combination locks is the potential for delayed access to the customer. If the customer makes a payment and brings their account current when the facility management office is closed or when personnel are unavailable, such as on weekends, after-hours, or holidays, the customer must then wait until the office is open and there are personnel available to remove the lock. Thus, the customer cannot gain access to their asset(s) at the location. For example, in the case of a storage unit, the customer would not be able to gain access to their possessions immediately after making payment to bring their account current. The delay between such a payment and removal of the lock does not cater to tenants who may need immediate access to their asset(s).

There is thus a need in a wide variety of access control environments for a system and method that allows or disallows access to a location such as a vacant storage unit, for example, without the need for an on-site attendant.

In various embodiments, the present disclosure provides a method for revealing unlock codes for locks based on an event such receiving an indication from a communications device in proximity to the physical lock. The indication can occur via the scanning of a code or reading of a tag by the communications device, for example. Upon receiving the indication, an unlock code for the physical tag can be retrieved and revealed via an interface of the communications device. In various embodiments, the communications device is provided with access to a unique URL associated with the physical lock and the unlock code is displayed via the URL.

BRIEF DESCRIPTION OF THE DRAWINGS

These and other embodiments of the disclosure will be discussed with reference to the following exemplary and non-limiting illustrations, in which like elements are numbered similarly, and where.

DETAILED DESCRIPTION

It should be understood that aspects of the present disclosure are described herein with reference to the drawings, which show illustrative embodiments. The illustrative embodiments herein are not necessarily intended to show all embodiments in accordance with the present disclosure, but rather are used to describe illustrative embodiments. Thus, aspects of the present disclosure are not intended to be construed narrowly in view of the illustrative embodiments. In addition, the present disclosure describes, among other things, a lock and event trigger system. Although the system is described with respect to its application in certain environments and locations, it is understood that the system could be implemented in any setting where access control may be useful.

Figure 1:
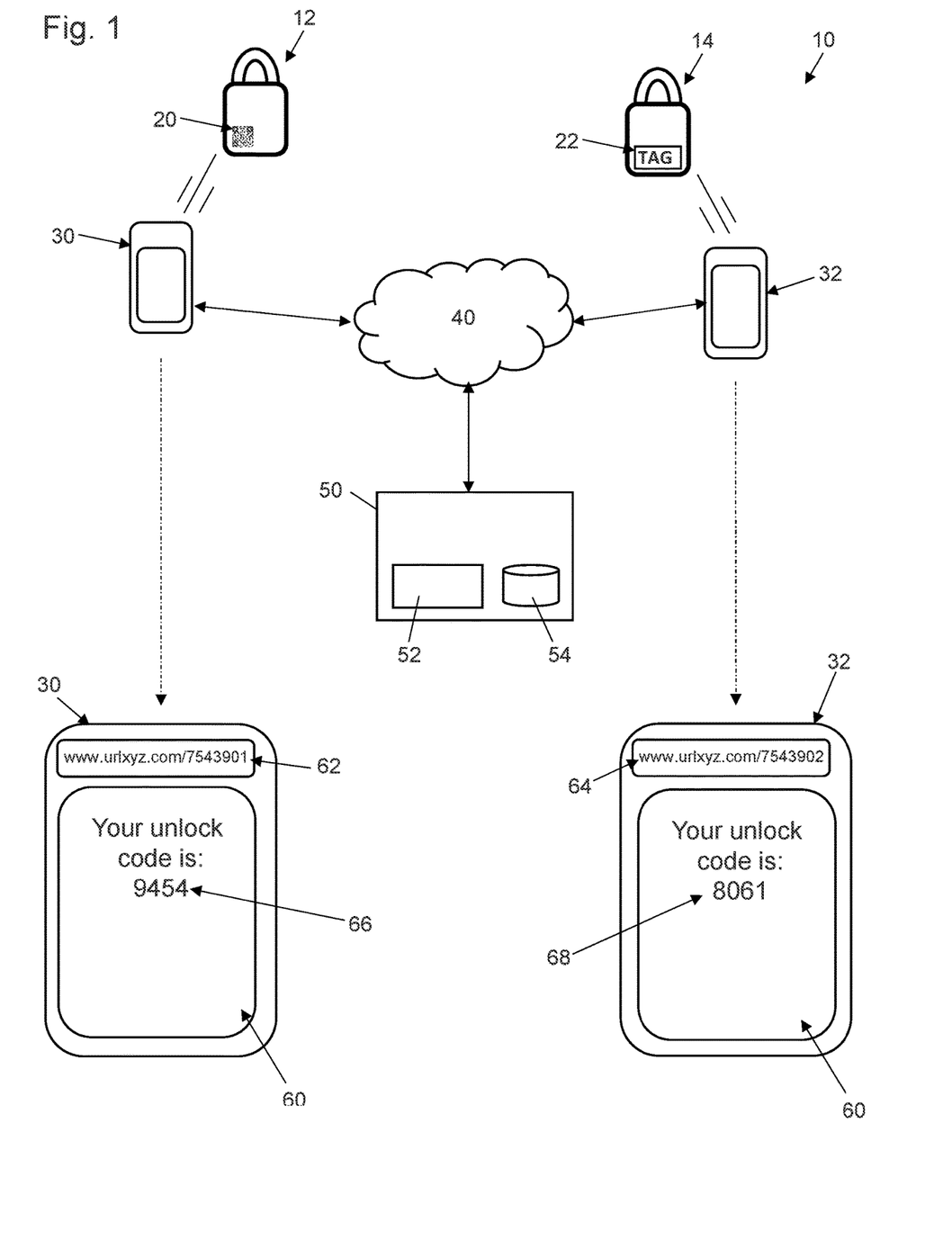
FIG. 1 is a schematic diagram of an embodiment of the present disclosure.

FIG. 1 is a schematic diagram of an access control system 10 in accordance with the present disclosure. In various embodiments, the system can be implemented in connection with a self-storage and/or other access control environments. A physical lock 12 can be maintained within a first access control environment and a second physical lock 14 can be maintained in the same first access control environment or a second access control environment. For example, the first access control environment can be a self-storage facility and the second access control environment can be a rental home environment. In various embodiments, one or both of the physical locks 12, 14 are "dumb" devices that are not electronically or electrically operable. Nevertheless, the physical locks 12, 14 may have one or more codes or one or more tags secured thereto or in close proximity thereto. As shown in FIG. 1, physical lock 12 has a quick response (QR) code 20 secured thereto and physical lock 14 has a near field communication (NFC) tag 22 secured thereto. In various embodiments, the code 20 and/or tag 22 can be secured to a physical lock (e.g., 12, 14) via a sticker or similar securing object. In other embodiments, the code 20 and/or tag 22 can be secured in close proximity to a physical lock (e.g., 12, 14) but not on or to the physical lock. For example, the code 20 and/or tag 22 can be secured to a wall, post, or other physical device in close proximity to a physical lock, which may make such code 20 or tag 22 more easily accessible to a user's communication device (e.g., 30, 32 in FIG. 1).

In various embodiments, a user such as a customer can use a mobile communications device (e.g., 30, 32), such as a mobile phone, to access a software application 60 available via, or having access to, an unlock code manager 50. The software application can be a proprietary program created and/or owned by a facility such as a self-storage facility, and which can be downloaded by the user via their device 30 and/or 32 from, for example, a website operated by or in communication with the unlock code manager 50, the Apple i Tunes App Store®, the Android App Store®, and the like accessible over a network 40. The unlock code manager 50 can be part of a controlled access system (CAS) or in communication via network 40 with a CAS (not shown). The CAS can be facility specific, such as a facility management system, and/or the CAS can be a lock management system handling locks across more than one facility. It will be appreciated that embodiments of the present disclosure are not limited to specific system architectures but are applicable to a wide variety of architectures.

The software application 60 can facilitate communication between the mobile device 30, 32 and the unlock code manager 50, which can be provided with a processor 52 and database 54, for example. The database 54 can store associated relationships between users, mobile communications devices, mobile telephone numbers, physical locks, physical lock identifiers unique Uniform Resource Locators (URLs) and/or unlock codes, for example.

In various embodiments, the software application 60 is a website accessed via one or more URLs using a browser on the mobile device 30 and/or 32. In such embodiments, the system can receive an indication from a communications device and thereafter provide access to a URL (e.g., 62 or 64 in FIG. 1) to the communications device such as via the software application 60. The system can further receive, e.g., via the URL, a credential associated with the customer and/or the communications device, determine whether the customer is authorized to view the unlock code associated with the physical lock and, upon the customer being authorized to receive the unlock code, display the unlock code (e.g., 66 or 68 in FIG. 1) at the web page accessed via the URL. It will be appreciated that the indication can be obtained based upon the communications device scanning the code 20 on a physical lock 12 or by using the mobile device 32 as an NFC reader to read an NFC tag 22 on a physical lock 14. It will be appreciated that the code 20 can be a QR code or other code. In accordance with the present disclosure, the communications device, a customer account, and/or a customer mobile phone number can be associated with the physical lock in the database 54.

It will be appreciated that the mobile communications device 30, 32 is not limited to a mobile phone, and can include tablets, wearable devices, personal digital assistants (PDAs), laptop computers, "smart" watches, "smart" glasses, and any other device capable of receiving input from the customer, and which is capable of being connected to the network 40.

As exemplified above, the software application 60 can include an interface that displays or otherwise reveals the unlock code. Upon seeing the displayed unlock code, the customer can then unlock the lock (12 or 14), and gain access to the desired access-controlled environment. In this way, a user need not memorize an unlock code but can use a readily available mobile communications device to obtain access to a locked environment or location to which the user has permission to access. Further, outside personnel is not required to be present or otherwise participate in assisting the user with gaining access to the location.

It will be appreciated that the unlock code manager 50 can be part of, or connected to, an access-controlled location or a management site via network 40. The management site can be remote from the access-controlled location and can serve multiple distributed access-controlled locations, such as in a central management site. In various embodiments, the management site can be located overseas, such as in a foreign call center.

The network 40 may be any type of network suitable to allow interaction between devices, such as a mobile device 30, 32 located at the access-controlled location and the unlock code manager 50. For example, the network 40 may be a wired network, a wireless network, or any combination thereof. Further, the network 40 may include a distributed computing network, an intranet, a local-area network (LAN) and/or a wide-area network (WAN), or any combination thereof. For example, the LAN may make use of WIFI in its many variations and the WAN may make use of broadband, cellular and/or satellite networks using technologies including, but not limited to, CDPD, CDMA, GSM, PDC, PHS, TDMA, FLEX, ReFLEX, iDEN, TETRA, DECT, DataTAC, Mobitex, EDGE and other 2G, 3G, 4G and LTE technologies. However, those of ordinary skill in the art will appreciate that the network 40 is not limited thereto.

As used herein, the term "customer" can include a renter, client, tenant, lessee, user, or an authorized agent. Although the present disclosure may be described in instances with respect to self-storage facilities, it will be appreciated that embodiments of the present disclosure can be implemented in any setting where access control as secured by a lock may be useful, such as hotel rooms, apartment buildings, storage containers, short-term housing rentals, and lockers. In addition, the present disclosure can be implemented within a controlled access system (CAS), such as for equipment rooms, vaults, hospitals, airports, government facilities, nuclear power facilities, water treatment facilities, weapon storage facilities, aircraft cockpits, and any other setting that requires restricted, selective, or monitored access.

Figure 2:
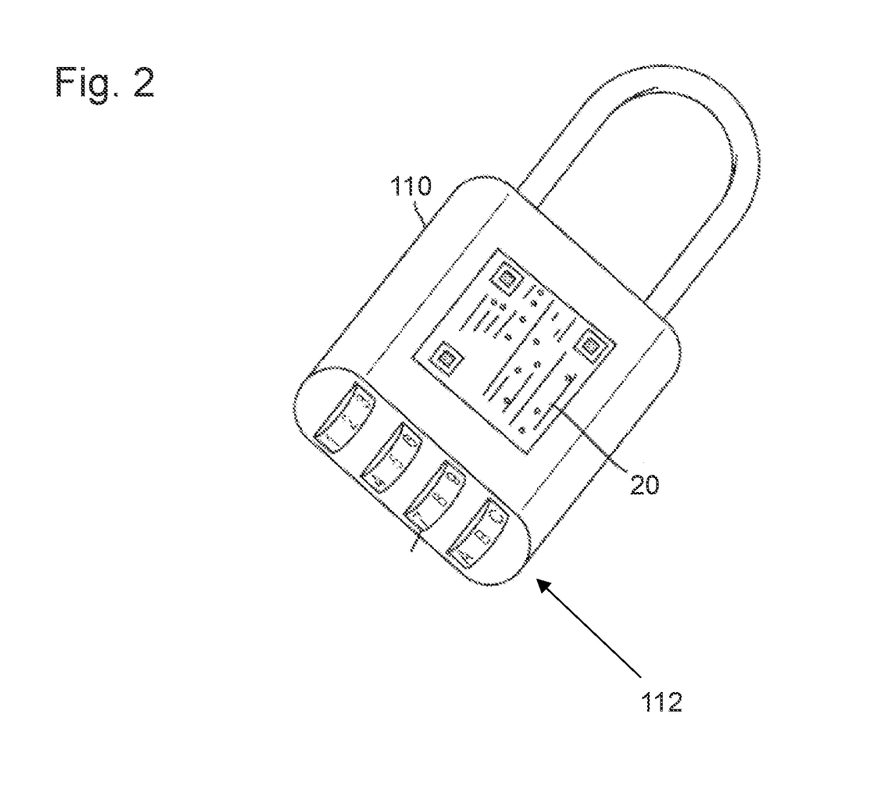
FIGS. 2 and 3 are embodiments of different physical locks in accordance with the present disclosure.
Figure 3:
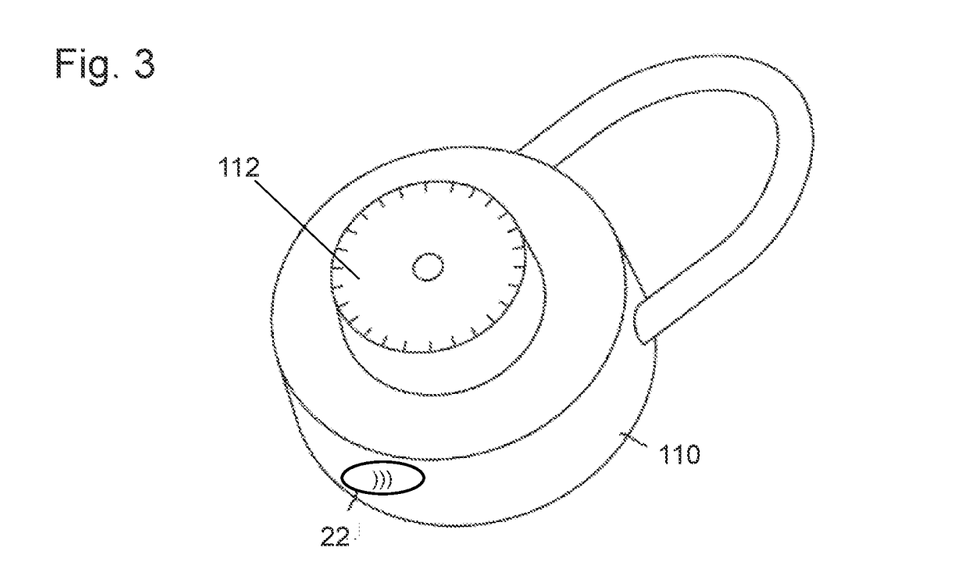

In various embodiments, a customer's access to a location is restricted by a physical lock 110 as illustrated in FIGS. 2 and 3. Locks 12 and 14 in FIG. 1 are examples of a lock 110. In various embodiments, the lock 110 can be a deadbolt, knob lock, or lever lock that includes a combination mechanism. The combination mechanism can include a tubular barrel, a rotary knob, pushpins, or a mechanical keypad, for example. As shown in FIG. 2, one form of a lock 110 is a combination padlock with a tubular barrel 112 requiring the unlock code to be dialed for each digit individually. As shown in FIG. 3, another specific form of a lock 110 can be a lock with a rotary knob 114 that requires an unlock code to be manually dialed in order to open the lock 110. In another embodiment, the lock 110 can be an electronic lock that accepts a combination input via digital keys or a touchscreen. In various embodiments, the lock 110 is a lock with no electronic circuitry or electronic components, and the lock 110 is not capable of electronic communication, whether with a remote or a local system. Lock 110 in FIG. 2 is shown with a QR code 20 and lock 110 in FIG. 3 is shown with an NFC tag 22. The QR code 20 and NFC tag 22 are examples of lock identifiers, which may also be embodied as a serial number, unique code, barcode, or other unique indicia.

Upon certain circumstances occurring, such as where a customer forgets the unlock code or where the customer makes payment to bring a delinquent account balance current, for example, embodiments herein can facilitate the release of an unlock code for the lock 110.

In various embodiments, the identifier can be printed on a label and affixed to the lock 110 or a tag attached to the lock 110 by either the manufacturer or the access-controlled facility. Unlock codes for each lock can be generated at the time of manufacturing by the lock manufacturer and transmitted with the lock 110 at the time of purchase by the access-controlled facility. In other embodiments, the access-controlled facility can generate unlock codes for each received lock 110.

The processing unit 52 of the unlock code manager 50 can associate the identifier with the unlock code for each lock 110 using an encryption technique, for example. The encryption technique can include at least one of a hash function, a key derivation function, a block cipher operation, and an obfuscation function. In addition, the encryption algorithm used by the processing unit 52 can include a Triple Data Encryption Standard (DES) algorithm, a RSA cryptosystem algorithm, a Blowfish cipher algorithm, a Twofish cipher algorithm, or an Advanced Encryption Standard (AES) algorithm. The encrypted identifier and unlock code pair can be stored in the database 54. The database 54 can be stored locally at an access-controlled facility, can be located on a remote cloud-based server, or at a CAS, for example.

Codes such as QR codes and tokens or tags as read, for example, by an NFC reader can initiate further actions for a user to receive an unlock code. As will be appreciated, NFC tags and readers communicate wirelessly with each other. Tags store a small amount of data on them that are sent to the reader in the form of electromagnetic pulses. Tags such as tag 22 can be in the form of a sticker and can include a thin copper coil and a small storage space on a microchip. The coil allows the tag to wirelessly receive power from an NFC reader such as may be present on a mobile device 30, 32 through a process known as electromagnetic induction. The NFC tag becomes energized by the NFC reader and transmits stored data within its microchip to the device. For example, a tag containing a URL as its payload will bring up a web browser.

In various embodiments employing a code such as QR code 20, the customer can use the camera of a mobile communications device to take a picture of the code, whereupon the scanned identifier triggers the opening of a web browser with a URL as associated with the scanned identifier.

In various embodiments, the unlock code manager 50 determines if the customer is authorized to view the unlock code at the designated URL. It will be appreciated that the customer can designate authorized parties beyond the customer to request and receive the unlock code. For example, a customer's spouse, authorized agents, business associates, attorneys, and any other parties whom the customer wishes to have access to the access-controlled location can have their credentials associated with the access-controlled location. In such embodiments, the database record for the lock(s) 110 at the access-controlled location includes a listing of all authorized parties and their respective credentials.

Figure 4:
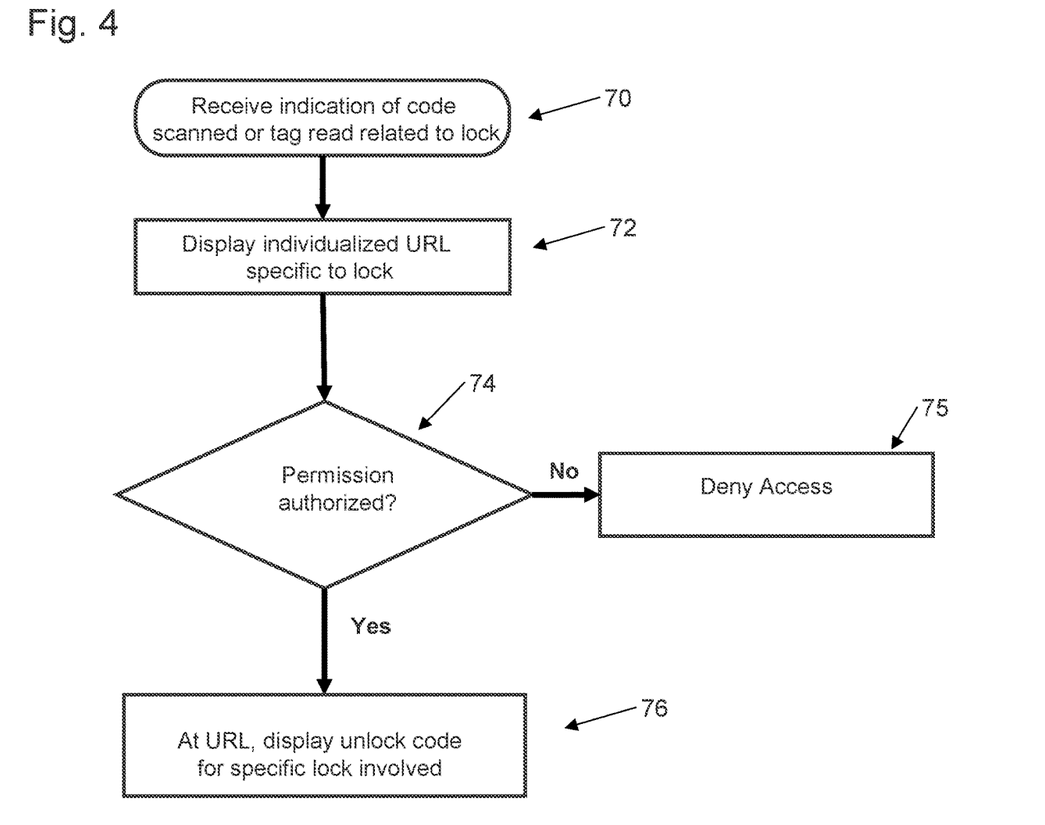
FIGS. 4 and 5 are flow diagrams illustrating aspects of the present disclosure.
Figure 5:
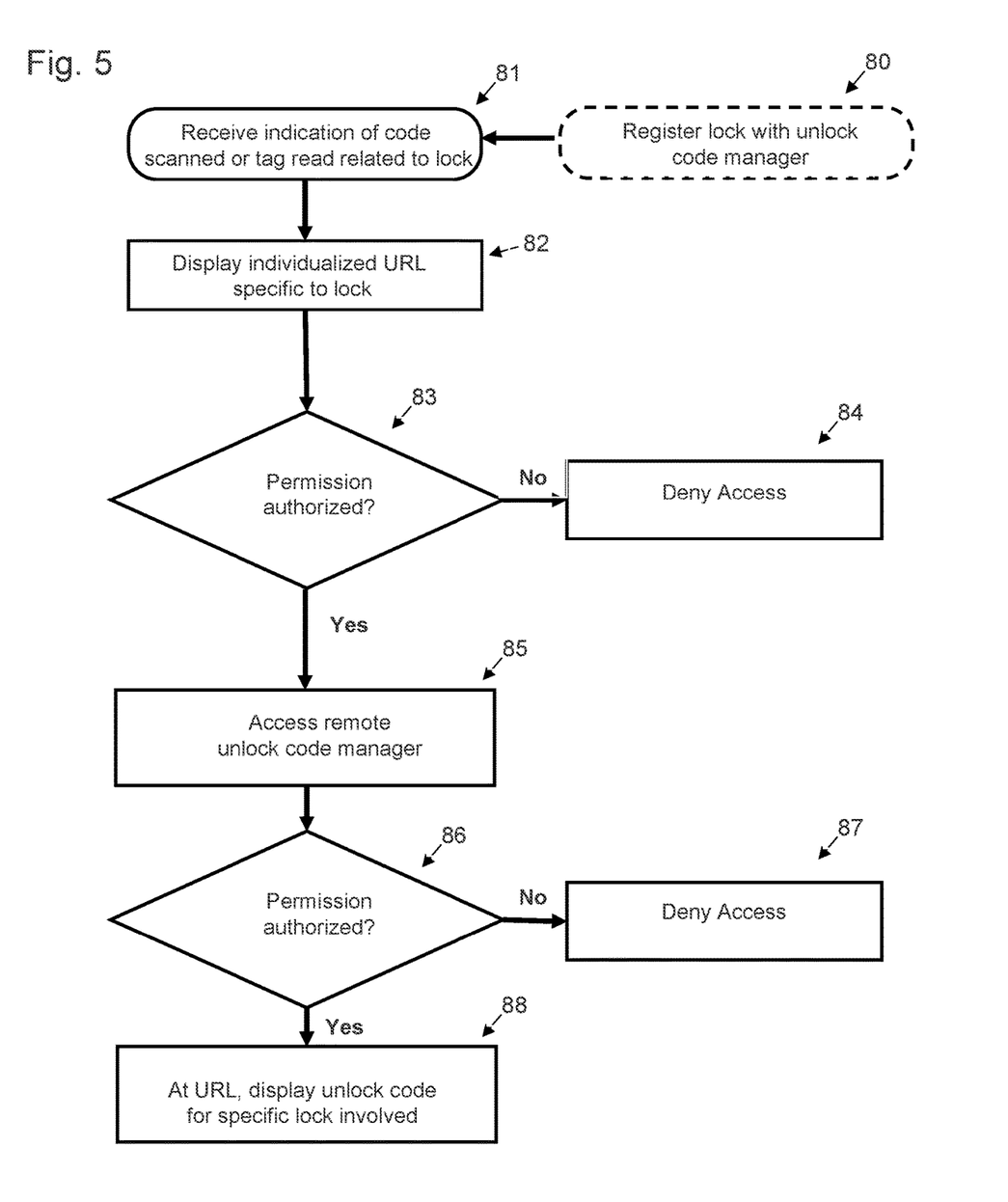

FIGS. 4 and 5 are flow charts illustrating processes in accordance with various embodiments of the present disclosure.

As shown in FIG. 4, the system, unlock code manager and/or software application on the mobile device receives an indication as at 70 that a code such as a QR code has been scanned or a tag such as an NFC tag has been read. This indication can be received from the mobile device and the code or tag can be on or associated with a specific lock as described elsewhere herein. As at 72, in response to receiving the indication, the browser on the mobile device displays a URL specifically associated with the specific lock. As at 74, it is determined whether the mobile device and/or user of the mobile device is authorized to view the unlock code for the specific lock. Such determination for authorization can be made by requiring the user to authenticate with a username and password, receive a text message with a code to be entered or other authentication process. If the user is not authorized, access is denied as at 75 and a message can be displayed on the device informing the user that access has been denied. In various embodiments where the user does not respond with a valid password, or does not provide valid credentials, the system and/or application can transmit an electronic message containing an error message to the user, optionally with a hyperlink that allows the user to take further action such as re-registering or obtaining missing credential(s) for access to the location. If the user is authorized, as at 76, the unlock code for the specific lock is displayed at the URL on the device's browser. In various embodiments, authentication can be handled in advance, such as where a user may have previously been authenticated and stays authenticated until logged out, for example.

As shown in FIG. 5, a specific lock may optionally be registered with unlock code manager 50 as at 80. As described elsewhere herein, the unlock code manager 50 can be part of a controlled access system (CAS) or in communication via network 40 with a CAS. The system, unlock manager and/or software application on the mobile device receives an indication as at 81 that a code such as a QR code has been scanned or a tag such as an NFC tag has been read. This indication can be received from a mobile device and the code or tag can be on or associated with a specific lock as described elsewhere herein. As at 82, in response to receiving the indication, a browser on the mobile device displays a URL specifically associated with the specific lock. As at 83, it is determined whether the mobile device and/or user of the mobile device is authorized to access the unlock code manager. Such determination can be made by requiring the user to authenticate with a username and password, receive a text message with a code to be entered or other authentication process. If the user is not authorized, access is denied as at 84 and a message can be displayed on the device informing the user that access has been denied. In various embodiments where the user does not respond with a valid password, or does not provide valid credentials, the system and/or application can transmit an electronic message containing an error message to the user, optionally with a hyperlink that allows the user to take action to access to the location. If the user is authorized, as at 85, access can be granted to the unlock code manager, which is remote from the mobile device. In such operation, it can then be determined whether the mobile device and/or user of the mobile device is authorized to view the unlock code for the specific lock as at 86. Such determination for authorization can be made by requiring the user to authenticate with a username and password, receive a text message with a code to be entered or other authentication process. For example, in connection with the various approaches described herein, it will be appreciated that the credentials may also be supplied via biometric means, such as with fingerprint, iris, voice, face, and gesture recognition means incorporated into the mobile device and/or software application. If the user is not authorized, access is denied as at 87 and a message can be displayed on the device informing the user that access has been denied. In various embodiments where the user does not respond with a valid password, or does not provide valid credentials, the system and/or application can transmit an electronic message containing an error message to the user, optionally with a hyperlink that allows the user to register for, or purchase, access to the location. If the user is authorized, as at 88, the unlock code for the specific lock is displayed, such as at the URL on the device's browser.

Figure 6:
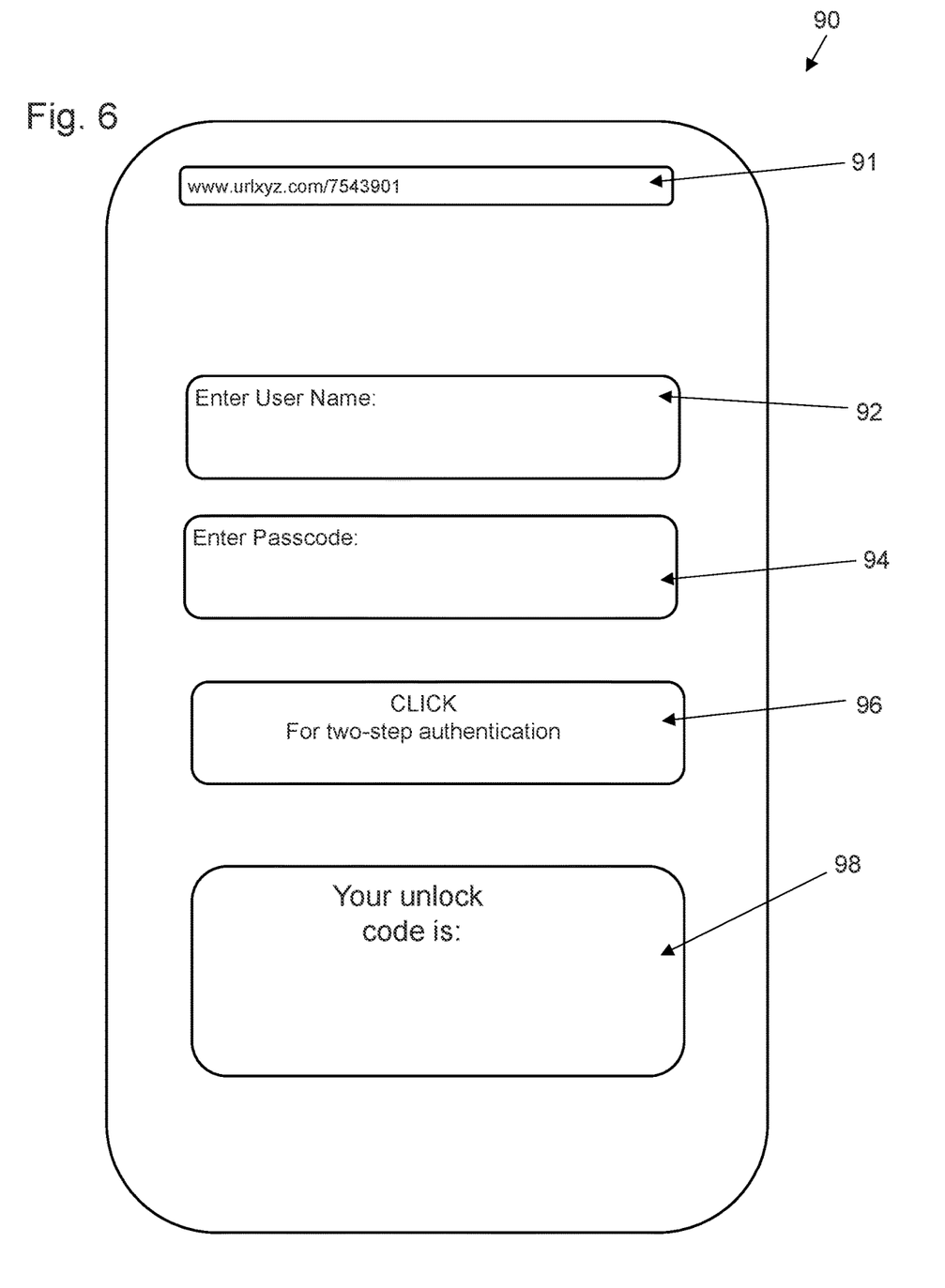
FIG. 6 is an exemplary mobile communications device display in accordance with embodiments of the present disclosure.

FIG. 6 is an illustration of a lock release interface for a software application according to an embodiment of the present disclosure. The unlock interface 90 can be displayed on the mobile device, for example, at a URL 91 once the customer activates the software application as described above. It will be appreciated that various other operations for displaying an unlock code as an alternative to a URL can be employed in accordance with the present disclosure. For example, the software application 60 can interact with other elements as described herein to reveal one or more unlock codes for one or more physical locks on the display of the mobile communications device, such as once a code or tag has been scanned or read in accordance with the present disclosure. The software application 60 can be a mobile application, a widget on a mobile device (such as presented on a home screen, for example), a notification application associated with a notification bar on a mobile device display, an application operable to send content such as an unlock code to a smartwatch or other wearable device for displaying the unlock code, a lock screen or home screen notification application, a voice application for audibly conveying an unlock code via one or more speakers on or connected to the mobile communications device and other types of applications for conveying unlock codes to a user of the mobile communications device.

In embodiments where a URL is not employed or required, upon receiving an indication of a scanned code or read tag (such as at 81 in FIG. 5), a software application such as one described above can operate to reveal an unlock code specific to the lock involved via a user interface. In so doing, the software application can communicate over a network with the unlock code manager 50, process authentication action(s) and display, render, reveal and/or convey the unlock code for the specific lock for use by the user of the mobile communications device.

As shown in FIG. 6, in embodiments involving a URL, the unlock interface 90 allows the customer to enter a username as at 92 and a password as at 94. In various embodiments, once the username and password (or other credential(s)) are accepted, the customer can select and/or initiate multi-factor authentication as at display item 96. In such case, the customer may be prompted to make a selection so as to receive an e-mail or text message in order to complete the authentication process. It will be appreciated that other forms of authentication can be provided, including, for example, permitting a user to be previously logged in by proper authentication credentials to facilitate automatic display of one or more unlock codes without requiring authentication credentials each time the customer wishes to receive an unlock code associated with the customer. Such authentication can occur via a persistent browser session and can be employed via session management where a user initially logs in to start a session and the session does not terminate without active sign off by the user or the expiration of some time limit, even if the user closes the operative browser. Such authentication can also occur via single sign-on (SSO) operations whereby a user may have previously logged in to a software application, social media account or other service requiring authentication, whereupon the user is permitted to automatically view a display of one or more unlock codes as described herein without requiring new or repeated entry of authentication credentials into a user interface. In various embodiments as will be appreciated to one of skill in the art, the system employs a session or cookies-based approach to these aspects of the present disclosure. In other embodiments as will be appreciated to one of skill in the art, the system employs JSON web tokens (JWT) for session management for these aspects of the present disclosure. In various embodiments, the unlock code is displayed as at 98 after the customer is authenticated. The customer can then use the unlock code to open the lock. It will be appreciated that multi-factor authentication is not required and embodiments of the present disclosure can operate without multi-factor authentication.

Figure 7:
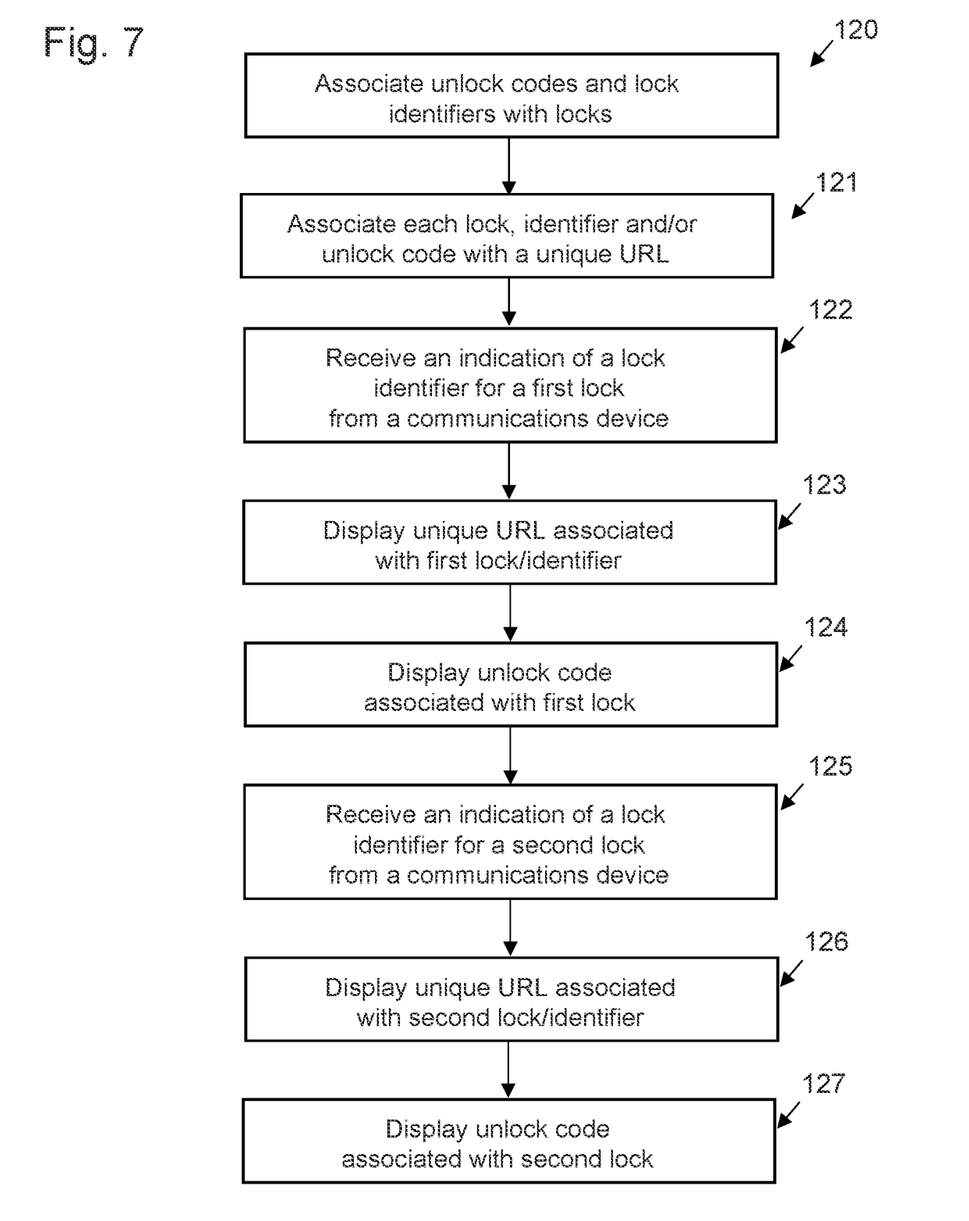
FIGS. 7 through 9 are flow diagrams illustrating aspects of the present disclosure.

Embodiments of the present disclosure can operate as shown in FIG. 7. As at 120, each lock of a group of physical locks is associated with a respective unlock code and a respective lock identifier. Each of the physical locks is adapted to restrict access to a specific physical location such as an access-controlled facility. Each lock, lock identifier and/or unlock code can be associated with a unique, individual URL as at 121. The system, unlock manager and/or software application on the mobile device receives an indication as at 122 that a code such as a QR code has been scanned or a tag such as an NFC tag has been read. This indication can be received from a mobile device and the code or tag can be on or associated with a specific lock as described elsewhere herein. As at 123, in response to receiving the indication, the unique URL specifically associated with the specific lock and/or lock identifier is displayed, such as via a browser on the mobile device. The unique URL can then display the unlock code associated with the specific lock as at 124 according to authentication procedures such as described elsewhere herein. For example, the URL may require credentials from a user of the communications device at the time the URL is opened. Alternatively, the user may have pre-stored credentials such that the unlock code for the specific lock is automatically displayed upon the URL being opened. As at 125, a separate indication of a lock identifier is received for a second lock from a communications device. The communications device for the second lock can be the same or different from the communications device for the first lock. This indication can be received based upon a code being scanned or a tag being read, where the code or tag is associated with the second lock as described elsewhere herein. As at 126, in response to receiving the indication, the unique URL specifically associated with the specific lock is displayed, such as via a browser on the mobile device. The unique URL can then display the unlock code associated with the specific lock as at 127 according to authentication procedures such as described elsewhere herein.

In various embodiments, the unique URLs for each lock, lock identifier and/or unlock code are established via a URL subdirectory structure having multiple subdirectories, wherein each subdirectory is associated with a respective physical lock. For example, a URL subdirectory could be https://www.urlxyzabc.com/Lock1 and a second URL subdirectory could be https://www.urlxyzabc.com/Lock2, where https://www.urlxyzabc com is the root directory In various embodiments, a URL subdirectory structure can be provided for one or more controlled access systems such that each controlled access system has its own URL subdirectory structure.

Figure 8:
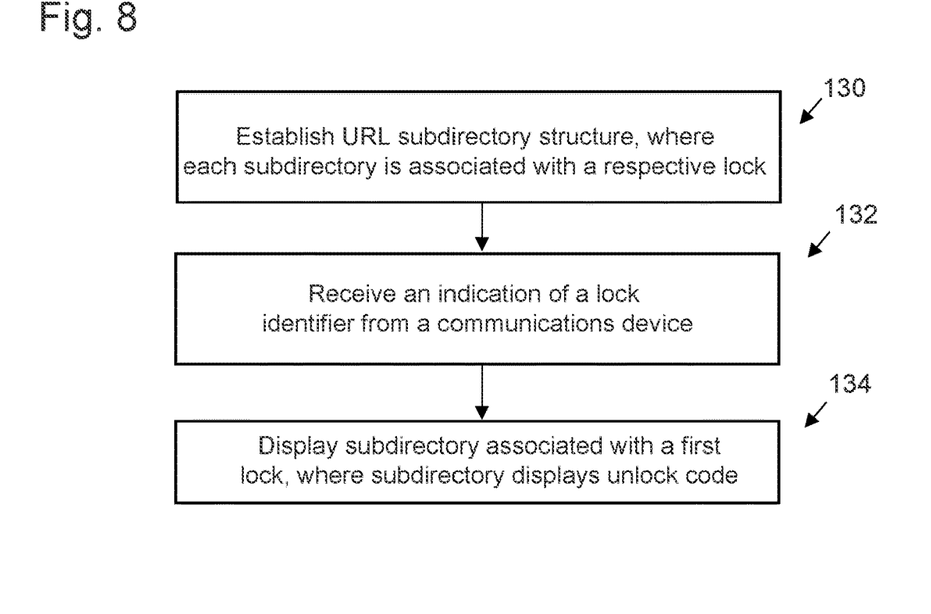

In these and other ways, embodiments of the present disclosure can operate as shown in FIG. 8. As at 130, a URL subdirectory is established and includes a plurality of subdirectories, each of which is associated with a respective physical lock of a group of locks, such as in database 54. As at 132, an indication is received by a communications device of a lock identifier associated with a first physical lock. As at 134, the subdirectory associated with the first physical lock displays a first unlock code associated with the first physical lock. This display can appear via a browser on the communications device, for example, and the unlock code associated with the lock can be displayed pursuant to authentication procedures such as described elsewhere herein.

In various embodiments, the URL subdirectory structure includes a primary or root URL, and the primary URL receives a credential from the communications device indicating that the communications device is authorized to display the first unlock code associated with the first physical lock. In various embodiments, a first URL subdirectory can be the same as a second URL subdirectory, and wherein the first URL subdirectory permits access by a first communications device for a time window that is closed before the second URL subdirectory permits access by a second communications device. In this way, different URL subdirectories can be re-used.

Figure 9:
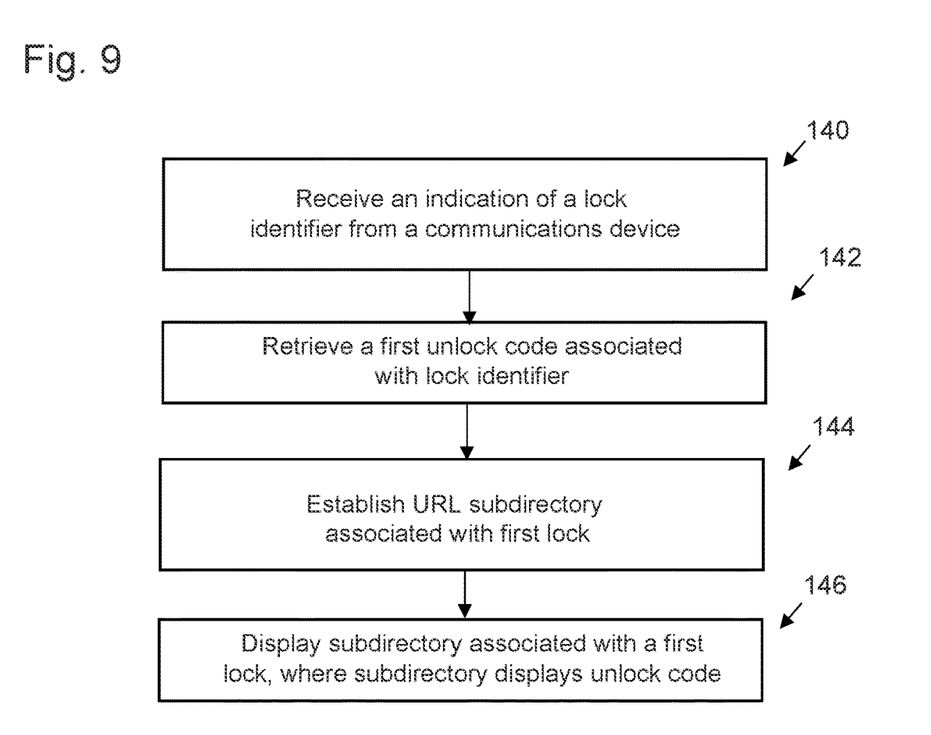

Embodiments of the present disclosure can further operate as shown in FIG. 9. As shown at 140 in FIG. 9, a first indication is received from a first communications device, where the first indication is an indication of a first lock identifier associated with a first physical lock of a group of physical locks. As at 142, a first unlock code associated with the first lock identifier is retrieved, such as by a controlled access system from a database. As at 144, a first URL subdirectory is then established and access to the first URL subdirectory is provided to the communications device, wherein the first URL subdirectory is associated with the first lock. As at 146, the subdirectory associated with the first physical lock displays an unlock code associated with the first physical lock. This display can appear via a browser on the communications device, for example, and the unlock code associated with the lock can be displayed pursuant to authentication procedures such as described elsewhere herein.

In similar fashion, a second lock identifier is associated with a second lock and an indication of a second lock identifier is received from a second communications device. The second communications device can be different or the same as the first communications device. A second unlock code associated with the second lock identifier is then retrieved, and a second URL subdirectory is established. Access to the second URL subdirectory is provided to the communications device, and this second URL subdirectory can then display the unlock code associated with the second physical lock. This display can appear via a browser on the communications device, for example, and the unlock code associated with the second lock can be displayed pursuant to authentication procedures such as described elsewhere herein. In various embodiments, the first URL subdirectory is different from the second URL subdirectory. In still other embodiments, the first URL subdirectory is the same as the second URL subdirectory, and the first URL subdirectory permits access by the first communications device for a time window that is closed before the second URL subdirectory permits access by the second communications device. As described elsewhere herein, the indication can be received upon an identifier being scanned or read.

In various embodiments, the unlock code can be a temporary unlock code which expires after a pre-determined period of time, or a one-time-use unlock code.

In embodiments of the present disclosure not involving one or more URLs, the system, device and/or method can operate by receiving (such as by an unlock code manager or CAS) from a mobile communications device, an indication of a lock identifier associated with a physical lock, wherein the indication is received upon the mobile communications device scanning a QR code associated with the physical lock or reading an NFC tag associated with the physical lock; retrieving, by the unlock code manager or CAS, an unlock code associated with the lock identifier; and transmitting, by the unlock code manager or CAS to the mobile communications device, the unlock code such that the unlock code can be revealed via the first communications device.

In certain embodiments in which the system includes a computing device, such as a mobile communications device, a CAS server, an unlock code manager, etc., the computing device is any suitable computing device (such as a server) that includes at least one processor and at least one memory device or data storage device. As further described herein, the computing device includes at least one processor configured to transmit and receive data or signals representing events, messages, commands, or any other suitable information between the computing device and other devices. The processor of the computing device is configured to execute the events, messages, or commands represented by such data or signals in conjunction with the operation of the computing device.

It will be appreciated that any combination of one or more computer readable media may be utilized. The computer readable media may be a computer readable signal medium or a computer readable storage medium. A computer readable storage medium may be, for example, but not limited to, an electronic, magnetic, optical, electromagnetic, or semiconductor system, apparatus, or device, or any suitable combination of the foregoing, including a portable computer diskette, a hard disk, a random access memory (RAM), a read-only memory (ROM), an erasable programmable read-only memory (EPROM or Flash memory), an appropriate optical fiber with a repeater, a portable compact disc read-only memory (CD-ROM), an optical storage device, a magnetic storage device, or any suitable combination of the foregoing. In the context of this document, a computer readable storage medium may be any tangible medium that can contain, or store a program for use by or in connection with an instruction execution system, apparatus, or device.

A computer readable signal medium may include a propagated data signal with computer readable program code embodied therein, for example, in baseband or as part of a carrier wave. Such a propagated signal may take any of a variety of forms, including, but not limited to, electromagnetic, optical, or any suitable combination thereof. A computer readable signal medium may be any computer readable medium that is not a computer readable storage medium and that can communicate, propagate, or transport a program for use by or in connection with an instruction execution system, apparatus, or device. Program code embodied on a computer readable signal medium may be transmitted using any appropriate medium, including but not limited to wireless, wireline, optical fiber cable, RF, etc., or any suitable combination of the foregoing.

As will be appreciated by one skilled in the art, aspects of the present disclosure may be illustrated and described herein in any of a number of patentable classes or context including any new and useful process, machine, manufacture, or composition of matter, or any new and useful improvement thereof. Accordingly, aspects of the present disclosure may be implemented entirely hardware, entirely software (including firmware, resident software, microcode, etc.) or combining software and hardware implementation that may all generally be referred to herein as a "circuit," "module," "component," or "system." Furthermore, aspects of the present disclosure may take the form of a computer program product embodied in one or more computer readable media having computer readable program code embodied thereon.

It will be appreciated that all of the disclosed methods and procedures herein can be implemented using one or more computer programs or components. These components may be provided as a series of computer instructions on any conventional computer-readable medium, including RAM, SATA DOM, or other storage media. The instructions may be configured to be executed by one or more processors which, when executing the series of computer instructions, performs or facilitates the performance of all or part of the disclosed methods and procedures.

Unless otherwise stated, devices or components of the present disclosure that are in communication with each other do not need to be in continuous communication with each other. Further, devices or components in communication with other devices or components can communicate directly or indirectly through one or more intermediate devices, components or other intermediaries. Further, descriptions of embodiments of the present disclosure herein wherein several devices and/or components are described as being in communication with one another does not imply that all such components are required, or that each of the disclosed components must communicate with every other component. In addition, while algorithms, process steps and/or method steps may be described in a sequential order, such approaches can be configured to work in different orders. In other words, any ordering of steps described herein does not, standing alone, dictate that the steps be performed in that order. The steps associated with methods and/or processes as described herein can be performed in any order practical. Additionally, some steps can be performed simultaneously or substantially simultaneously despite being described or implied as occurring non-simultaneously.

It will be appreciated that algorithms, method steps and process steps described herein can be implemented by appropriately programmed computers and computing devices, for example. In this regard, a processor (e.g., a microprocessor or controller device) receives instructions from a memory or like storage device that contains and/or stores the instructions, and the processor executes those instructions, thereby performing a process defined by those instructions. Furthermore, aspects of the present disclosure may take the form of a computer program product embodied in one or more computer readable media having computer readable program code embodied thereon.

Computer program code for carrying out operations for aspects of the present disclosure may be written in any combination of one or more programming languages, including an object oriented programming language such as Java, Scala, Smalltalk, Eiffel, JADE, Emerald, C++, C#, VB.NET, Python or the like, conventional procedural programming languages, such as the "C" programming language, Visual Basic, Fortran 2003, Perl, COBOL 2002, PHP, ABAP, dynamic programming languages such as Python, Ruby and Groovy, or other programming languages. The program code may execute entirely on a user's computer, partly on a user's computer, as a stand-alone software package, partly on a user's computer and partly on a remote computer or entirely on the remote computer or server.

Where databases are described in the present disclosure, it will be appreciated that alternative database structures to those described, as well as other memory structures besides databases may be readily employed. The drawing figure representations and accompanying descriptions of any exemplary databases presented herein are illustrative and not restrictive arrangements for stored representations of data. Further, any exemplary entries of tables and parameter data represent example information only, and, despite any depiction of the databases as tables, other formats (including relational databases, object-based models and/or distributed databases) can be used to store, process and otherwise manipulate the data types described herein. Electronic storage can be local or remote storage, as will be understood to those skilled in the art. Appropriate encryption and other security methodologies can also be employed by the system of the present disclosure, as will be understood to one of ordinary skill in the art.

Although the present approach has been illustrated and described herein with reference to preferred embodiments and specific examples thereof, it will be readily apparent to those of ordinary skill in the art that other embodiments and examples may perform similar functions and/or achieve like results. All such equivalent embodiments and examples are within the spirit and scope of the present approach.

The invention claimed is:
1. A method, comprising:
associating each of a plurality of unlock codes and each of a plurality of lock identifiers with a respective physical lock of a plurality of physical locks in a database, wherein each of the plurality of physical locks is adapted to restrict access to each of a plurality of physical locations and wherein each of the plurality of physical locks is incapable of electronic communication;

associating each of the plurality of lock identifiers with a respective URL of a plurality of URLs;

receiving from a first communications device a first indication of a first lock identifier associated with a first physical lock of the plurality of physical locks;

revealing a first URL of the plurality of URLs, wherein the first URL is associated with the first lock identifier and displays a first unlock code of the plurality of unlock codes, wherein the first unlock code is associated with the first physical lock;

receiving from a second communications device a second indication of a second lock identifier associated with a second physical lock of the plurality of physical locks; and revealing a second URL of the plurality of URLs, wherein the second URL is associated with the second lock identifier and displays a second unlock code of the plurality of unlock codes, wherein the second unlock code is associated with the second physical lock, wherein the first URL is different from the second URL.

2. The method of claim 1, further comprising:
prior to displaying the first unlock code, determining that the first communications device is authorized to display the first unlock code associated with the first physical lock; and prior to displaying the second unlock code, determining that the second communications device is authorized to display the second unlock code associated with the second physical lock.

3. The method of claim 1, wherein the first indication is obtained based upon the first communications device scanning or reading the lock identifier.

4. The method of claim 1, wherein the first lock identifier comprises a quick response (QR) code or an NFC tag.

5. The method of claim 1, further comprising associating the first communications device with the first physical lock in the database.

6. A method, comprising:
establishing a URL subdirectory structure comprising a plurality of subdirectories associated with a controlled access system, wherein each subdirectory of the plurality of subdirectories is associated with a respective physical lock of a plurality of physical locks;

receiving, by the controlled access system from a first communications device, a first indication of a first lock identifier associated with a first physical lock of the plurality of physical locks; and permitting access by the first communications device to a first subdirectory of the plurality of subdirectories, wherein the first subdirectory displays a first unlock code associated with the first physical lock.

7. The method of claim 6, further comprising:
prior to permitting access by the first communications device to the first subdirectory, determining, by the controlled access system, that the first communications device is authorized to display the first unlock code associated with the first physical lock.

8. The method of claim 6, wherein the first indication is obtained based
upon the communications device scanning the lock identifier and wherein the lock identifier appears on the first physical lock.

9. The method of claim 6, wherein the first lock identifier comprises a QR code or an NFC tag.

10. The method of claim 1, further comprising:
receiving, by the controlled access system from a second communications device, a second indication of a second lock identifier associated with a second physical lock of the plurality of physical locks; and permitting access by the second communications device to a second subdirectory of the plurality of subdirectories, wherein the second subdirectory displays a second unlock code associated with the second physical lock.

11. The method of claim 10, wherein the second subdirectory is different from the first subdirectory.

12. The method of claim 6, wherein each of the plurality of physical locks is adapted to restrict access to each of a plurality of physical locations and wherein each of the plurality of physical locks is incapable of electronic communication.

13. The method of claim 6, wherein the URL subdirectory structure comprises a primary URL, and wherein the primary URL receives a credential from the first communications device indicating that the first communications device is authorized to display the first unlock code associated with the first physical lock.

14. The method of claim 6, wherein the first subdirectory of the plurality of subdirectories receives a credential from the first communications device indicating that the first communications device is authorized to display the first unlock code associated with the first physical lock.

15. A method, comprising:
receiving, by a controlled access system from a first communications device, a first indication of a first lock identifier associated with a first physical lock of a plurality of physical locks;

retrieving, by the controlled access system from a database, a first unlock code associated with the first lock identifier;

establishing a first URL subdirectory and permitting access by the first communications device to the first URL subdirectory, wherein the first URL subdirectory displays the first unlock code.

16. The method of claim 15, further comprising:
receiving, by the controlled access system from a second communications device, a second indication of a second lock identifier associated with a second physical lock of the plurality of physical locks;

retrieving, by the controlled access system from the database, a second unlock code associated with the second lock identifier;

establishing a second URL subdirectory and permitting access by the second communications device to the second URL subdirectory, wherein the second URL subdirectory displays the second unlock code.

17. The method of claim 16, wherein the first URL subdirectory is different from the second URL subdirectory.

18. The method of claim 16, wherein the first URL subdirectory is the same as the second URL subdirectory, and wherein the first URL subdirectory permits access by the first communications device for a time window that is closed before the second URL subdirectory permits access by the second communications device.

19. The method of claim 16, wherein the first indication is received upon the first communications device scanning a QR code associated with the first physical lock.

20. The method of claim 16, wherein the first indication is received upon the first communications device reading an NFC tag associated with the first physical lock.

* * * * *